United States Patent
Wu (10) Patent No.: US 10,447,561 B2
(45) Date of Patent: Oct. 15, 2019

(54) BFD METHOD AND APPARATUS

(71) Applicant: Huawei Technologies Co., Ltd., Shenzhen (CN)

(72) Inventor: Xiangping Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 15/837,442

(22) Filed: Dec. 11, 2017

(65) Prior Publication Data

US 2018/0102951 A1    Apr. 12, 2018

Related U.S. Application Data

(63) Continuation of application No. PCT/CN2016/070063, filed on Jan. 4, 2016.

(30) Foreign Application Priority Data

Jun. 29, 2015    (CN) .......................... 2015 1 0369358

(51) Int. Cl.
   *H04L 12/26*    (2006.01)
   *H04L 12/24*    (2006.01)

(52) U.S. Cl.
   CPC .......... *H04L 43/04* (2013.01); *H04L 41/0654* (2013.01); *H04L 43/0811* (2013.01); *H04L 43/10* (2013.01)

(58) Field of Classification Search
   CPC ................................ H04L 43/04; H04L 43/10
   See application file for complete search history.

(56) References Cited

U.S. PATENT DOCUMENTS

| 7,561,527 B1 | 7/2009 | Katz et al. |
| 2008/0225731 A1* | 9/2008 | Mori ...................... H04L 47/10 370/242 |
| 2010/0023632 A1 | 1/2010 | Liu |

(Continued)

FOREIGN PATENT DOCUMENTS

| CN | 101212400 A | 7/2008 |
| CN | 101808022 A | 8/2010 |

(Continued)

OTHER PUBLICATIONS

Jiang, J., et al. "An Improved Design of BFD Timer Negotiation Mechanism in ASICH Hardware", Software Guide vol. 12, No. 8, Aug. 2013, 14 pages.

(Continued)

*Primary Examiner* — Kent K Krueger
(74) *Attorney, Agent, or Firm* — Conley Rose, P.C.

(57) ABSTRACT

A bidirectional forwarding detection (BFD) method, apparatus, and system, where when a first virtual machine receives BFD packets from a second virtual machine, prediction duration and a predetermined quantity of sample time intervals are obtained. An eigenvalue is obtained according to the prediction duration and the predetermined quantity of sample time intervals, where the eigenvalue indicates a possibility of fault occurrence on an application in the second virtual machine. For an application that is running on the second virtual machine, the eigenvalue is compared with a preset fault determining criterion of the application, and whether the application is faulty is determined according to a comparison result.

20 Claims, 4 Drawing Sheets

Fault determining method → $\psi$

For an application B:
$\psi$ is greater than $\Phi 1$: Faulty
$\psi$ is less than $\Phi 1$: Not faulty For an application C:
$\psi \in (0, \Phi 1]$: Not faulty
$\psi \in (\Phi 1, \Phi 2]$: Fault level 1
$\psi \in (\Phi 2, \Phi 3]$: Fault level 2
$\psi$ is greater than $\Phi 3$: Fault level 3

(56) References Cited

U.S. PATENT DOCUMENTS

2013/0114402 A1     5/2013    Ould-Brahim et al.
2016/0359728 A1*   12/2016    Ficara .................... H04L 45/14

FOREIGN PATENT DOCUMENTS

| CN | 102347855 A | 2/2012 |
|---|---|---|
| CN | 102487338 A | 6/2012 |
| CN | 104104644 A | 10/2014 |
| CN | 104283711 A | 1/2015 |
| CN | 104426696 A | 3/2015 |
| EP | 2568663 A1 | 3/2013 |
| WO | 2012071851 A1 | 6/2012 |

OTHER PUBLICATIONS

English Translation of Jiang, J., et al. "An Improved Design of BFD Timer Negotiation Mechanism in ASICH Hardware", Software Guide vol. 12, No. 8, Aug. 2013, 9 pages.
Machine Translation and Abstract of Chinese Publication No. CN104283711, Jan. 14, 2015, 32 pages.
Machine Translation and Abstract of Chinese Publication No. CN104104644, Oct. 15, 2014, 21 pages.
Machine Translation and Abstract of Chinese Publication No. CN101808022, Aug. 18, 2010, 16 pages.
Machine Translation and Abstract of Chinese Publication No. CN102347855, Feb. 8, 2012, 13 pages.
Machine Translation and Abstract of International Publication No. WO2012071851, Jun. 7, 2012, 18 pages.
Foreign Communication From a Counterpart Application, PCT Application No. PCT/CN2016/070063, English Translation of International Search Report dated Mar. 24, 2016, 2 pages.
Foreign Communication From a Counterpart Application, PCT Application No. PCT/CN2016/070063, English Translation of Written Opinion dated Mar. 24, 2016, 6 pages.
Machine Translation and Abstract of Chinese Publication No. CN102487338, Jun. 6, 2012, 14 pages.
Machine Translation and Abstract of Chinese Publication No. CN104426696, Mar. 18, 2015, 20 pages.
Foreign Communication From a Counterpart Application, Chinese Application No. 201510369358.6, Chinese Search Report dated Feb. 13, 2019, 2 pages.
Foreign Communication From a Counterpart Application, Chinese Application No. 201510369358.6, Chinese Office Action dated Feb. 28, 2019, 3 pages.
Zhang, M., et al.,"Use Cases Requiring New Features of BFD," XP015100488, draft-zhang-bfd-new-use-cases-00.txt, Jul. 4, 2014, 9 pages.
Foreign Communication From a Counterpart Application, European Application No. 16816903.5, Extended European Search Report dated May 3, 2018, 8 pages.

* cited by examiner

BFD METHOD AND APPARATUS

CROSS-REFERENCE TO RELATED APPLICATIONS

This application is a continuation of International Patent Application No. PCT/CN2016/070063 filed on Jan. 4, 2016, which claims priority to Chinese Patent Application No. 201510369358.6 filed on Jun. 29, 2015. The disclosures of the aforementioned applications are hereby incorporated by reference in their entireties.

TECHNICAL FIELD

The present disclosure relates to the field of communications technologies, and in particular, to a bidirectional forwarding detection (BFD) method and apparatus.

BACKGROUND

In a current virtualized cloud environment, a heartbeat mechanism is usually used between virtual machines (which may be equivalent to communications nodes) for fault detection. A basic principle of the heartbeat mechanism is as follows. A node q monitors a node p is used as an example. The node p transmits heartbeat packets to the node q at a constant time interval Δi. The node q receives the heartbeat packets at a constant time interval Δt. If the node q does not receive a heartbeat packet transmitted by the node p in a specified time (for example, three Δi), it is determined that the node p is faulty. For example, if several consecutive packets are lost, that is, the node q receives no response from the node p at several time intervals, it is considered that the node p is faulty.

Time of such heartbeat detection is usually at a second level and even at a minute level and cannot satisfy a reliability requirement for a telecommunication service that has a relatively high real-time requirement. Particularly, when a data rate reaches gigabit per second, a long fault feedback time indicates a loss of a large amount of data. A demand for rapidly performing communication fault monitoring between adjacent nodes is increasing day by day and becomes increasingly important. Therefore, a method for rapidly detecting a path established between bidirectional routing engines, that is, BFD, is introduced. By means of association with an upper-layer routing protocol, the BFD can implement rapid routing convergence, rapidly detect a link, and provide millisecond-level detection.

A focus of the BFD is to determine BFD time. The BFD time mainly depends on the following three parameters: a minimum interval required by a local node to transmit a BFD packet (i.e., Desired Min Tx Interval (DMTI)), a minimum interval that can be supported by the local node and that is for receiving the BFD packet (i.e., Required Min Rx Interval (RMRI)), and a multiplier of the detection time Detect Multi (Detect time multiplier). After a local node B receives a BFD packet transmitted by a peer node A, an RMRI that is of the node A and that is carried in the detection packet is compared with a DMTI of the node B. A larger value of the RMRI and the DMTI is used as a rate at which the node B transmits a BFD packet.

The BFD includes an asynchronous mode and a query mode. The two detection modes are different. Therefore, detection time is different, and is usually implemented using different Detect Multi values.

Detection time in the asynchronous mode=Received Detect Multi of a remote end×Max (an RMRI of a local end, a received DMTI).

Detection time in the query mode=Detect Multi of a local end×Max (an RMRI of a local end, a received DMTI).

A DMTI, an RMRI, and a Detect Multi may be configured independently on each node. However, after the DMTI, the RMRI, and the Detect Multi are configured, a node receives a BFD packet from another node at a constant time interval. If the node receives no detection packet from the other node in a specified time, it is determined that an application/service of the other node is faulty.

In actual application, there is a problem. That is, with respect to requirements of telecommunication services of different application types, relatively accurate fault determining cannot be implemented using a same constant detection time interval. If a single determining manner is used for all applications, fault determining results of different applications are biased. For example, requirements of outage time and detection speeds are different for different applications. For example, outage time required for a voice data stream cannot exceed 200 milliseconds (ms), and outage time required for signaling cannot exceed 500 ms. Though a real-time requirement of a data service is not as high as that of a voice service, a same specified detection time interval, for example, 300 ms, cannot be applicable to different application types and may cause corresponding misjudgment. For example, a fault may occur on a voice application of which permitted outage time is 200 ms. When the outage time is 250 ms, the fault is not reported because the outage time is less than the BFD time interval 300 ms. For another example, a fault may not occur on a signaling application of which permitted outage time is 500 ms. When the outage time is 400 ms, it is considered that the signaling application is faulty by mistake because the outage time is greater than the BFD time interval 300 ms.

SUMMARY

In view of this, embodiments of the present disclosure provide a BFD method, apparatus, and system.

According to a first aspect of the embodiments of the present disclosure, a BFD method is provided, where the method is applied to a process in which a first virtual machine receives BFD packets, the BFD packets are from a second virtual machine, and the method includes obtaining prediction duration and a predetermined quantity of sample time intervals, where the prediction duration is a time interval between a current moment and a moment at which the first virtual machine receives a BFD packet last time, and the sample time interval is an arrival time interval between two adjacent BFD packets, obtaining an eigenvalue according to the prediction duration and the predetermined quantity of sample time intervals, where the eigenvalue is used to indicate a possibility of fault occurrence on an application in the second virtual machine, and for an application that is running on the second virtual machine, comparing the eigenvalue with a preset fault determining criterion of the application, and determining, according to a comparison result, whether the application is faulty.

With reference to the first aspect, in a first possible implementation manner of the first aspect, obtaining an eigenvalue according to the prediction duration and the predetermined quantity of sample time intervals includes obtaining an average value and a variance of the sample time intervals according to the predetermined quantity of sample time intervals, obtaining a distribution function according to the average value and the variance of the sample time intervals, substituting the prediction duration into the distribution function to calculate a function value, and obtaining the eigenvalue according to the function value.

With reference to the first aspect, or the first possible implementation manner of the first aspect, in a second possible implementation manner of the first aspect, obtaining the eigenvalue according to the function value includes taking the negative logarithm of the function value to obtain the eigenvalue.

With reference to any one of the first aspect, or the possible implementation manners of the first aspect, in a third possible implementation manner of the first aspect, the preset fault determining criterion of the application includes a non-fault value range and a fault value range, and comparing the eigenvalue with a preset fault determining criterion of an application, and determining, according to a comparison result, whether the application is faulty includes determining whether the eigenvalue falls within the non-fault value range or the fault value range, and determining that the application is faulty if the comparison result is that the eigenvalue falls within the fault value range, or determining that the application is not faulty if the comparison result is that the eigenvalue falls within the non-fault value range.

With reference to any one of the first aspect, or the possible implementation manners of the first aspect, in a fourth possible implementation manner of the first aspect, after determining that the application is faulty, the method further includes performing fault rectification on the application.

With reference to any one of the first aspect, or the possible implementation manners of the first aspect, in a fifth possible implementation manner of the first aspect, the preset fault determining criterion of the application includes a non-fault value range and at least two fault value ranges, and each fault value range corresponds to a different fault level, and comparing the eigenvalue with a preset fault determining criterion of an application, and determining, according to a comparison result, whether the application is faulty includes determining whether the eigenvalue falls within the non-fault value range or one of the at least two fault value ranges, and determining that a fault level of the application is a fault level corresponding to the fault value range if the comparison result is that the eigenvalue falls within a fault value range, where the fault value range is one of the at least two fault value ranges, or determining that the application is not faulty if the comparison result is that the eigenvalue falls within the non-fault value range.

With reference to any one of the first aspect, or the possible implementation manners of the first aspect, in a sixth possible implementation manner of the first aspect, each fault value range corresponds to a different fault rectification manner, and after determining that a fault level of the application is a fault level corresponding to the fault value range, the method further includes performing, on the application, fault rectification corresponding to the fault value range.

With reference to any one of the first aspect, or the possible implementation manners of the first aspect, in a seventh possible implementation manner of the first aspect, the predetermined quantity is M, the M sample time intervals are obtained from M+1 consecutive BFD packets, and M is an integer greater than 20.

According to a second aspect of the embodiments of the present disclosure, a BFD apparatus is provided, where the apparatus is applied to a process in which a first virtual machine receives BFD packets, these BFD packets are from a second virtual machine, and the apparatus includes an obtaining module configured to obtain prediction duration and a predetermined quantity of sample time intervals, where the prediction duration is a time interval between a current moment and a moment at which the first virtual machine receives a BFD packet last time, and the sample time interval is an arrival time interval between two adjacent BFD packets, a calculation module configured to obtain an eigenvalue according to the prediction duration and the predetermined quantity of sample time intervals that are obtained by the obtaining module, where the eigenvalue is used to indicate a possibility of fault occurrence on an application that is running on the second virtual machine, a comparison module configured to compare the eigenvalue obtained by the calculation module with a preset fault determining criterion of an application that is running on the second virtual machine, and a determining module configured to determine, according to a comparison result of the comparison module, whether the application is faulty.

With reference to the second aspect, in a first possible implementation manner of the second aspect, the calculation module includes a first calculation unit configured to obtain an average value and a variance of the sample time intervals according to the predetermined quantity of the sample time intervals that are obtained by the obtaining module, a second calculation unit configured to obtain a distribution function according to the average value and the variance that are of the sample time intervals and that are obtained by the first calculation unit, a third calculation unit configured to substitute the prediction duration obtained by the obtaining module into the distribution function obtained by the second calculation unit, to calculate a function value, and a fourth calculation unit configured to obtain the eigenvalue according to the function value obtained by the third calculation unit.

With reference to the second aspect, or the first possible implementation manner of the second aspect, in a second possible implementation manner of the second aspect, the fourth calculation unit is further configured to take the negative logarithm of the function value obtained by the third calculation unit to obtain the eigenvalue.

With reference to any one of the second aspect, or the possible implementation manners of the second aspect, in a third possible implementation manner of the second aspect, the preset fault determining criterion of the application includes a non-fault value range and a fault value range, the comparison module is further configured to determine whether the eigenvalue obtained by the calculation module falls within the non-fault value range or the fault value range, and if the comparison result of the comparison module is that the eigenvalue falls within the fault value range, the determining module determines that the application is faulty, or if the comparison result of the comparison module is that the eigenvalue falls within the non-fault value range, the determining module determines that the application is not faulty.

With reference to any one of the second aspect, or the possible implementation manners of the second aspect, in a fourth possible implementation manner of the second aspect, the apparatus further includes a fault rectification module, and the fault rectification module is configured to perform fault rectification on the application after the determining module determines that the application is faulty.

With reference to any one of the second aspect, or the possible implementation manners of the second aspect, in a fifth possible implementation manner of the second aspect, the preset fault determining criterion of the application includes a non-fault value range and at least two fault value ranges, and each fault value range corresponds to a different fault level. The comparison module is further configured to determine whether the eigenvalue obtained by the calculation module falls within the non-fault value range or one of the at least two fault value ranges, and if the comparison result of the comparison module is that the eigenvalue falls within a fault value range, the determining module determines that a fault level of the application is a fault level corresponding to the fault value range, where the fault value range is one of the at least two fault value ranges, or if the comparison result of the comparison module is that the eigenvalue falls within the non-fault value range, the determining module determines that the application is not faulty.

With reference to any one of the second aspect, or the possible implementation manners of the second aspect, in a sixth possible implementation manner of the second aspect, each fault value range corresponds to a different fault rectification manner, and the apparatus further includes a fault rectification module, and after the determining module determines that the fault level of the application is the fault level corresponding to the fault value range, the fault rectification module is configured to perform, on the application, fault rectification corresponding to the fault value range.

With reference to any one of the second aspect, or the possible implementation manners of the second aspect, in a seventh possible implementation manner of the second aspect, the predetermined quantity is M, the M sample time intervals are obtained from M+1 consecutive BFD packets, and M is an integer greater than 20.

According to a third aspect of the embodiments of the present disclosure, a BFD system is provided, where the system includes the first virtual machine, the second virtual machine, and any one of the BFD apparatuses.

According to the technical solutions provided in the embodiments of the present disclosure, a BFD mechanism is introduced in a virtualized environment to implement rapid fault detection, and to satisfy a reliability requirement for a telecommunication service that has a high real-time requirement. A predetermined quantity of arrival time intervals between two adjacent BFD packets is obtained, an eigenvalue is obtained by means of statistical calculation according to the time intervals, and is compared with fault determining values of different applications, and then corresponding fault determining and rectification are performed such that fault determining criteria in BFD can satisfy requirements of the different applications, and fault determining for each application is more accurate. Compared with a same determining manner in conventional BFD, fault misjudgment is greatly reduced.

DESCRIPTION OF EMBODIMENTS

The embodiments of the present disclosure provide a BFD method, apparatus, and system.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments in the present disclosure without creative effort shall fall within the protection scope of the present disclosure. Sometimes, a "BFD packet" may be referred to as a "detection packet" or a "packet," and an "application" may be equivalent to a communication "service."

Figure 1:
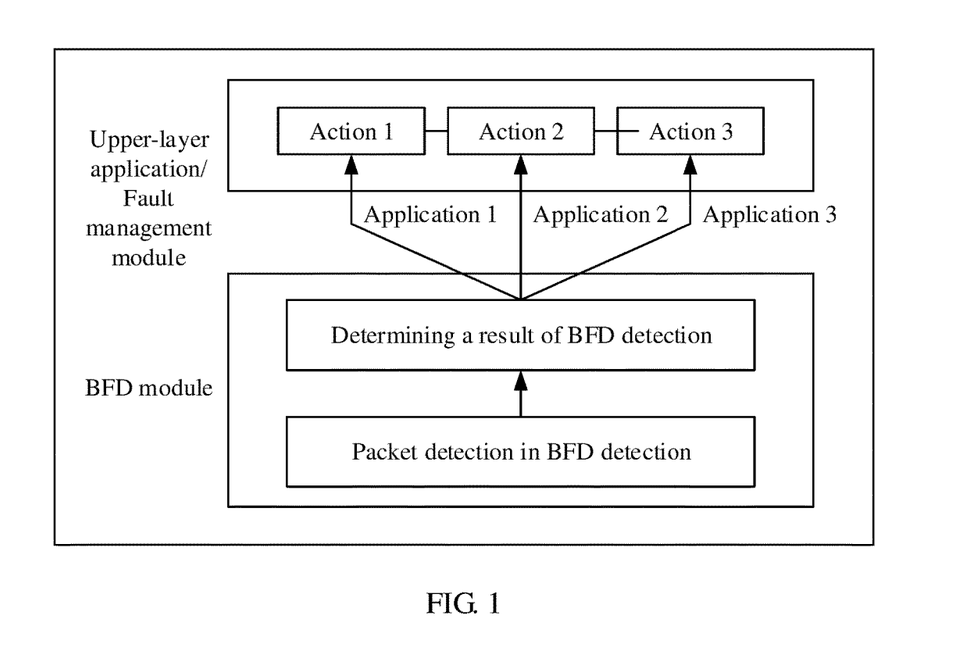
FIG. 1 is a schematic diagram of a BFD architecture.

Two functions, that is, fault detection and fault determining, are combined in a conventional BFD module. For example, in a process of BFD, when three consecutive BFD packets are lost (which may be no packet is received at three packet intervals), it is determined that a communication connection to a peer node is interrupted, and fault rectification is triggered for a corresponding application/service. Referring to FIG. 1, FIG. 1 is a schematic diagram of a BFD architecture. A conventional BFD module outputs only one determined detection result, that is, a Boolean result about whether a fault occurs, and then notifies a fault management module of the Boolean result. The fault management module performs subsequent fault rectification. In a conventional BFD mechanism, a difference between applications is not considered, and regardless of any type of application, a same detection time is set as a detection criterion. In the BFD, fault determining is performed, using only one single detection time, on applications that are running on a peer node, and some applications may be misjudged. Therefore, the BFD cannot be applicable to different types of applications.

To resolve the foregoing technical problem, in the solutions of the present disclosure, "function separation" is performed on fault detection and fault determining in a conventional BFD module such that different reliability detection criteria are used for different types of applications. That is, the BFD module no longer provides a Boolean result about whether a fault occurs, but is only responsible for detecting a packet and reporting a detection result to an upper-layer application or a dedicated fault management module. The upper-layer application or the dedicated fault management module determines, according to the detection result and fault criteria of different applications, whether a fault occurs. The following merely uses a fault management module as an example. Replacement made by an upper-layer application and the like for the fault management module based on a same principle shall fall within the protection scope of the present disclosure.

Figure 2:
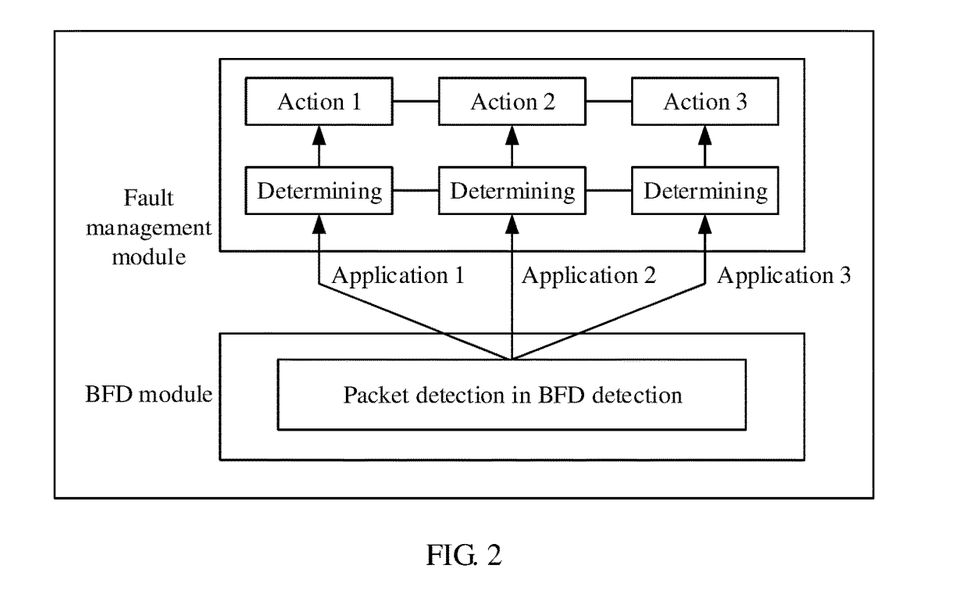
FIG. 2 is a schematic diagram of a BFD architecture according to an embodiment of the present disclosure.

Referring to FIG. 2, FIG. 2 is a schematic diagram of a BFD architecture according to an embodiment of the present disclosure. A BFD module detects a detection packet, reads an arrival time of the packet from information carried in the packet, or directly records an arrival time of the packet (the arrival time of the packet is a moment at which the detection packet of a peer node arrives at a local node), then obtains arrival time intervals between different packets, and performs a series of mathematical operations on several time intervals to obtain an eigenvalue ψ related to the arrival time intervals of the packets. In addition, the BFD architecture further includes a fault management module. A threshold (Φ) is predetermined, as a criterion for determining whether a fault occurs, for each application according to a fault determining requirement of the application, and the Φ is prestored in the fault management module. In this way, the BFD module processes a time interval of detection packets to obtain an eigenvalue ψ, and reports the eigenvalue ψ to the fault management module. The fault management module compares the value ψ with the prestored value Φ of each application, determines, according to a comparison result, whether each application that is running on the peer node is faulty, and then takes a fault management action on a faulty application according to a determining result.

Figure 3:
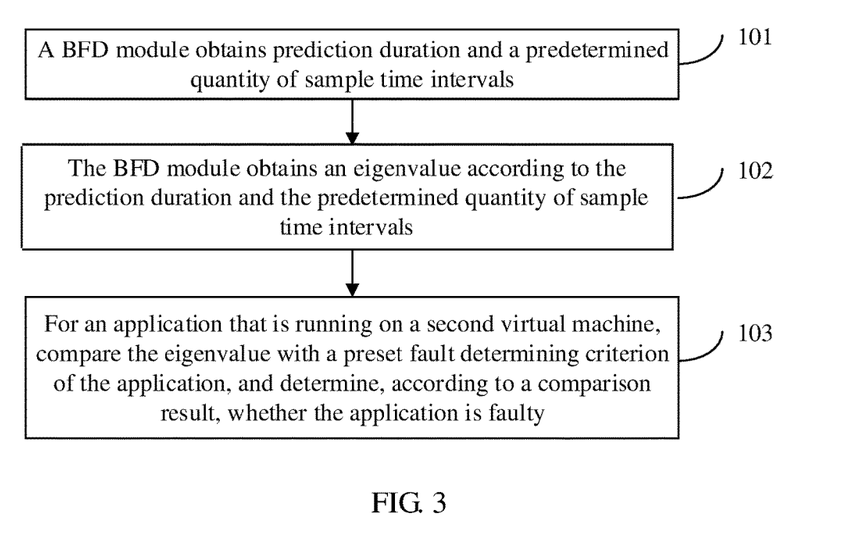
FIG. 3 is a flowchart of a BFD method according to an embodiment of the present disclosure.

Referring to FIG. 3, FIG. 3 is a flowchart of a BFD method according to an embodiment of the present disclosure. In a specific implementation process, a first virtual machine and a second virtual machine generally refer to two virtual machines that are communicating with each other in a virtualized cloud environment. Generally, bidirectional communication is performed between the two virtual machines. When the first virtual machine receives a BFD packet from the second virtual machine, the second virtual machine may receive and detect a BFD packet from the first virtual machine. Therefore, a BFD mechanism in each virtual machine is similar. That the first virtual machine receives a BFD packet from the second virtual machine may be equivalent to that the BFD packet from the second virtual machine arrives at the first virtual machine. Further, the method includes the following steps.

Step 101: When the first virtual machine receives BFD packets from the second virtual machine, a BFD module obtains prediction duration and a predetermined quantity of sample time intervals, where the prediction duration is a time interval between a current moment and a moment at which the first virtual machine receives a BFD packet last time, and the sample time interval is an arrival time interval between two adjacent BFD packets.

Figure 4:
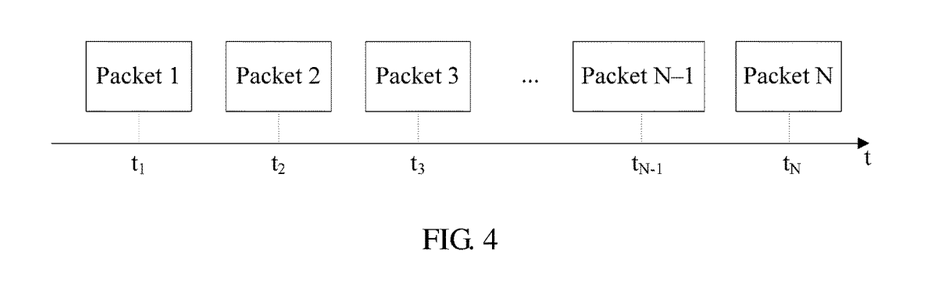
FIG. 4 is a schematic diagram of a time interval between consecutive packets according to an embodiment of the present disclosure.

In the present disclosure, a relationship between a time interval of two detection packets and a probability of successfully receiving a packet is more concerned in the BFD mechanism. Therefore, an arrival time interval between adjacent detection packets, particularly, an arrival time interval between consecutive detection packets, is obtained in the method. For example, consecutive 100 detection packets are sequentially transmitted, and are numbered from 1 to 100. Statistics collection is performed on arrival time intervals between a first detection packet and a second detection packet, between the second detection packet and a third detection packet, between the third detection packet and a fourth detection packet, . . . , and between a $99^{th}$ detection packet and a $100^{th}$ detection packet, and there are 99 arrival time intervals in total. For a more universal case, refer to FIG. 4. FIG. 4 is a schematic diagram of a time interval between consecutive detection packets according to an embodiment of the present disclosure. A series of consecutive packets, a packet 1, a packet 2, . . . , a packet N, are received by the first virtual machine from the second virtual machine according to a time sequence. In the method, sample data of arrival time intervals that are of the packets and that need to be obtained is $(t_2-t_1), (t_3-t_2), \ldots, (t_N-t_{N-1})$. $t_n$ indicates an arrival time of an $n^{th}$ packet. n may be any positive integer. $t_N$ usually indicates an arrival time of a latest packet before a current moment.

In a specific implementation process, each obtained sample time interval may be used, or not all sample time intervals may be used. For example, M sample time intervals are selected for statistical calculation. A specific value of M usually depends on a requirement of a sample statistical method, sometimes is related to a quantity of packets that can be stored in a virtual machine, and sometimes is related to time validity of a packet. M is a positive integer. To satisfy an experience requirement of sample statistics, M is greater than 20 generally.

Step 102: The BFD module obtains an eigenvalue according to the prediction duration and the predetermined quantity of sample time intervals, where the eigenvalue is used to indicate a possibility of fault occurrence on an application in the second virtual machine.

In a specific implementation process, the BFD module may use a mathematical statistical method to perform statistical calculation on M arrival time intervals that are of packets and that are obtained in step 101 to obtain an eigenvalue. The eigenvalue may describe a possibility of successfully receiving, on a basis that the first virtual machine successfully receives the last BFD packet transmitted by the second virtual machine and after the prediction duration expires, a next BFD packet transmitted by the second virtual machine. The eigenvalue is to be described in detail later. It can be learned that this solution is different from conventional BFD in which merely detection time is output.

Step 103: For an application that is running on the second virtual machine, compare the eigenvalue with a preset fault determining criterion of the application, and determine, according to a comparison result, whether the application is faulty.

A principle of step 101 and step 102 in the present disclosure is as follows. When the first virtual machine finds that a detection packet is lost, two possibilities may exist. One is that the detection packet arrives late because of a network factor and the like, and the other is that the application in the second virtual machine is really faulty. In this case, it needs to be determined whether the packet arrives late or the application in the second virtual machine is faulty. A determining basis is a possibility of successfully receiving a next packet, where the possibility is predicted based on statistics collection performed on arrival time intervals of previous detection packets and according to the time interval between the current moment and the moment at which the packet is received last time. Therefore to implement the function, statistics collection needs to be first performed on the arrival time intervals of the detection packets that are successfully received previously.

In a specific implementation process, when the detection packets arrive at the first virtual machine, the BFD module obtains or records an arrival time of each detection packet, and stores the arrival time in a storage queue. To ensure time validity of the time intervals, the arrival times are usually stored in a storage queue with a constant length, and a stacking manner is used as a storage manner. For example, the storage queue has a constant length of 100 arrival times. When a $101^{st}$ arrival time is stored, a value of an originally stored first arrival time is overflowed. This ensures that the storage queue always has 100 values. An arrival time interval between two adjacent detection packets varies according to factors such as a node processing capability and a network transmission capability. Generally, it is considered that such a fluctuation in the time interval is subject to Gaussian distribution. For example, when communications modules on a network operate normally, a time interval between two adjacent detection packets arriving at the first virtual machine is 1 s. The arrival time interval between the detection packets fluctuates because performance of the communications modules on the network fluctuates. Therefore, the time interval between the adjacent detection packets arriving at the first virtual machine fluctuates at 1 second (s), and arrival time intervals of all packets are in Gaussian distribution.

Figure 5:
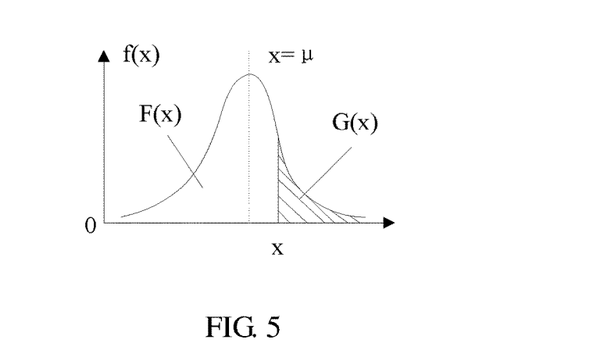
FIG. 5 is a diagram of a distribution function that needs to be constructed in a BFD method according to an embodiment of the present disclosure.

In a specific implementation process, a Gaussian distribution function may be correspondingly constructed according to a Gaussian distribution characteristic of the arrival time intervals of the detection packets, for statistics collection. As shown in FIG. 5, FIG. 5 shows a distribution function constructed in a BFD method according to an embodiment of the present disclosure. A horizontal coordinate x indicates prediction duration. x is a variable because of uncertain arrival of a next detection packet at a current moment. G(x) indicates a probability of successfully receiving a next detection packet after the current moment. F(x) indicates probability density. It can be easily deduced from FIG. 5 that shorter prediction duration results in a higher probability of successfully receiving the next packet, and longer prediction duration results in an increasingly low probability of receiving the next packet. The distribution function f(x) is determined according to a predetermined quantity of sample time intervals, that is, determined according to arrival times of detection packets in a queue with a constant length. The queue with the constant length of 100 arrival times is still used as an example. According to f(x), statistics collection needs to be performed on impact of an arrival time interval between adjacent packets on a probability of successfully receiving a packet. Therefore, 99 sample time intervals Δt1, Δt2, . . . , Δt99 are generated according to arrival times of 100 consecutive detection packets. The sample time interval herein refers to an arrival time interval between two adjacent detection packets. Statistics collection is performed on the 99 sample time intervals to calculate an average value μ and a variance σ of the 99 sample time intervals. Then, the distribution function is determined according to the average value μ and the variance σ. A universal formula is as follows:

$$\mu = \frac{1}{n}\sum_{j=1}^{n}\Delta t(j), \text{ and}$$

$$\sigma = \sqrt{\frac{1}{n}\sum_{j=1}^{n}[\Delta t(j) - \mu]^2},$$

where n indicates the quantity of sample time intervals, Δt(j) is a time interval, j is an integer, j∈[1,n], μ indicates the average value, and σ indicates the variance. Further, f(x) can be calculated using the following equation:

$$f(x) = \frac{1}{\sigma\sqrt{2\pi}} e^{-\frac{(x-\mu)^2}{2\sigma^2}}.$$

It can be learned that each time a new detection packet is received, the time intervals of the detection packets in the storage queue vary. Though the new time interval does not have great impact on the samples as a whole, the average value μ and the variance σ that are obtained by performing statistics collection on 99 sample time intervals, and the distribution function f(x) are updated in real time. This can ensure that detection and prediction performed on the new packet can be closer to a latest communication status of a current network. Therefore, particular time validity and accuracy are ensured.

Further, a probability of normally receiving, by the first virtual machine, a packet at a current moment may be obtained as follows:

$$F(x; \mu, \sigma) = \frac{1}{\sigma\sqrt{2\pi}} \int_{-\infty}^{x} e^{-\frac{(x-\mu)^2}{2\sigma^2}} dx.$$

A probability of receiving, by the first virtual machine, no packet at the current moment, that is, a probability of receiving a packet after the current moment, is as follows:

$$G(x; \mu, \sigma) = \frac{1}{\sigma\sqrt{2\pi}} \int_{x}^{+\infty} e^{-\frac{(x-\mu)^2}{2\sigma^2}} dx.$$

In this solution, the following is concerned currently. If a latest detection packet successfully arrives at $t_{last}$, but no packet is received at the current moment $t_{now}$, a probability of receiving a packet after the current moment $t_{now}$ is $G(t_{now}-t_{last}; \mu_{last}, \sigma_{last})$. $\mu_{last}$ and $\sigma_{last}$ respectively indicate an average value and a variance that are obtained, when the latest detection packet is stored in the queue with the constant length, by performing statistics collection on arrival time intervals that are between all adjacent detection packets and that are in the current queue. $t_{now}-t_{last}$ is latest prediction duration.

Optionally, $G(t_{now}-t_{last}; \mu_{last}, \sigma_{last})$ may be used as an eigenvalue. A corresponding fault determining probability is set for each application. For example, for an application A that is running on the second virtual machine, a fault determining probability is 0.2. The fault determining probability is prestored in the BFD module. If $G(t_{now}-t_{last}; \mu_{last}, \sigma_{last})$ is less than 0.2, it is considered that there is a very low probability of receiving a next detection packet after $t_{now}$, and that the application A is faulty. If $G(t_{now}-t_{last}; \mu_{last}, \sigma_{last})$ is greater than 0.2, it is considered that there is a very high probability of receiving a next packet after $t_{now}$, and that the application A is not faulty.

Optionally, $G(t_{now}-t_{last}; \mu_{last}, \sigma_{last})$ indicates a probability. Therefore, $G(t_{now}-t_{last}; \mu_{last}, \sigma_{last})$ is a decimal, and sometimes may be a relatively small decimal. Directly comparing such a decimal may cause a specific error and uncertainty. For ease of description, the logarithm log[$G(t_{now}-t_{last}; \mu_{last}, \sigma_{last})$] may be taken. $0 < G(t_{now}-t_{last}; \mu_{last}, \sigma_{last}) < 1$. Therefore, log[$G(t_{now}-t_{last}; \mu_{last}, \sigma_{last})$] < 0. $\psi = -\log[G(t_{now}-t_{last}; \mu_{last}, \sigma_{last})]$ is defined, and $\psi$ is the eigenvalue described in step 102. In addition, it can be easily seen that the eigenvalue is continuously updated when packets are continuously updated.

It should be noted that in the present disclosure, statistics collection and calculation performed on the sample time intervals are not limited to the above-mentioned mathematical method. A similar or derivative statistical mathematical model related to Gaussian probability statistics may also be used to perform corresponding statistical calculation. These are statistical methods well-known in the mathematics field.

Therefore, this is not listed one by one in this embodiment of the present disclosure. Processing including transformation subsequently performed on a probability value can also be implemented using a basic mathematical operation. Therefore, a solution in which any conventional mathematical operation is used to perform statistics collection on the sample time intervals to finally obtain the eigenvalue shall fall within the protection scope of the present disclosure.

Figure 6:
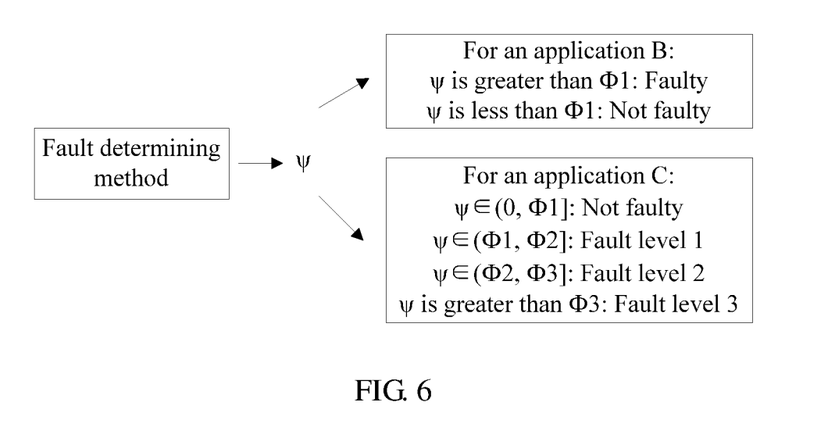
FIG. 6 is a schematic diagram of a method for determining, by means of BFD, whether an application is faulty according to an embodiment of the present disclosure.

In a specific implementation process of step 103, a fault management module compares a ψ value with a preset fault determining criterion of an application that is running on the second virtual machine, and determines whether the application is faulty. A determining process is shown in FIG. 6. FIG. 6 is a schematic diagram of a method for determining, by means of BFD, whether an application is faulty according to an embodiment of the present disclosure. There are various applications, and the applications have different functions and different reliability indicator requirements. Therefore, there are multiple different determining criteria. There are the following two common cases (both an application B and an application C described below are applications that are running on the second virtual machine, but do not refer to any specific applications. Fault determining values of the application B and the application C are prestored in the BFD module).

Case 1: If the fault determining value of the application B is a single threshold Φ1, a preset fault determining criterion of the application B includes a non-fault value range (0, Φ1) and a fault value range [Φ1, +∞). The fault management module determines which value range an eigenvalue ψ falls within. If a comparison result is that the eigenvalue falls within [Φ1, +∞), the fault management module determines that the application B is faulty. If a comparison result is that the eigenvalue falls within (0, Φ1), the fault management module determines that the application B is not faulty or that the application B makes no response.

Correspondingly, if the application B is faulty, the fault management module further takes a fault rectification action corresponding to the application B such that the application B can run normally. If the application B is not faulty or is recovered after a fault is rectified, the fault management module skips performing fault rectification or makes no response.

Case 2: If the fault determining values of the application C are at least two threshold ranges, a preset fault determining criterion of the application C includes a non-fault value range and at least two fault value ranges. Each fault value range corresponds to a different fault level. Each fault level corresponds to a different fault rectification action. The fault value ranges are in a one-to-one correspondence with fault levels. The fault levels are in a one-to-one correspondence with fault rectification actions. Different threshold ranges correspond to different fault levels, that is, corresponding to different fault severity degrees. The fault management module compares an eigenvalue ψ with the non-fault value range and the at least two fault value ranges, determines a value range within which the eigenvalue falls, and determines a fault level of the application C. As shown in FIG. 6, when ψ∈(0, Φ1], the fault management module determines that the application C is not faulty or that the application C makes no response, when ψ∈(Φ1, Φ2], the fault management module determines that the application C is at a fault level 1, when ψ∈(Φ2, Φ3], the fault management module determines that the application C is at a fault level 2, and when ψ∈(Φ3, +∞), the fault management module determines that the application C is at a fault level 3. Fault severity degrees of the fault level 1, the fault level 2, and the fault level 3 increase sequentially.

Correspondingly, if the fault management module determines that the application C is faulty, the fault management module further takes a corresponding fault rectification action according to the fault level of the application C such that the application C can run normally. If the application C is not faulty or is recovered after a fault is rectified, the fault management module skips performing fault rectification.

As a supplementary description, some applications have different fault levels and corresponding fault rectification manners, mainly depending on how many software and hardware resources need to be invoked during fault rectification. For example, software and hardware resources that need to be invoked when rectification of a lower-level fault is performed on the application C are fewer and simpler than software and hardware resources that need to be invoked when rectification of a higher-level fault is performed, and correspondingly, overall costs are lower. When the application C is at the fault level 1, a fault rectification manner corresponding to the fault level 1 is used, and fault rectification can be completed by invoking corresponding software and hardware resources. Therefore, such a fault rectification manner corresponding to a level better satisfies a requirement of properly utilizing resources.

In a specific implementation process, fault determining values Φ of different applications are obtained according to reliability and real-time requirements for the applications by means of a large quantity of experiential attempts. For example, fault detection and recovery need to be performed more rapidly on an application having high real-time and reliability requirements. However, if detection time is reduced, an error report rate increases correspondingly. Therefore, to reduce the detection time and to obtain a proper error report rate, a proper threshold Φ needs to be determined. For example, an application developer may determine, in a range in which an error report rate can be accepted, a proper threshold based on a test statistics result of a large quantity of thresholds Φ, detection time, and error report rates. This reflects an advantage of this solution: When a rapid BFD capability is ensured, an error report rate can be controlled at an acceptable level. In addition, determining Φ is further related to an algorithm for obtaining the eigenvalue in step 102. If the eigenvalue is a probability, Φ may indicate a preselected probability value. If the eigenvalue is the logarithm of a probability, Φ is the logarithm of a preselected probability value. If the eigenvalue is the negative logarithm of a probability, Φ is the negative logarithm of a preselected probability value. In conclusion, in the present disclosure, a probability $G(x)$ that a next packet is about to arrive needs to be obtained, an original value of Φ is an experiential permitted probability $G(x_0)$ obtained by the application developer by means of evaluation according to a large amount of previous experience. If an operation method is used to obtain $G(x)$ and to finally obtain an eigenvalue, the same operation method is used to obtain $G(x_0)$ and to obtain corresponding Φ.

The technical solutions in the present disclosure are different from a conventional BFD mechanism. Statistical analysis performed on an arrival time interval between adjacent detection packets is introduced such that in BFD, information about whether each application is faulty is no longer simply output based on single detection time. First, mathematical statistics processing is performed based on the arrival time interval between adjacent packets to calculate an eigenvalue. The eigenvalue is compared with fault determining values preset for different applications, and a fault status of each application is pertinently determined. Therefore, in the BFD, requirements for the different applications can be satisfied, and unified determining is no longer performed, thereby reducing fault misjudgment.

Figure 7:
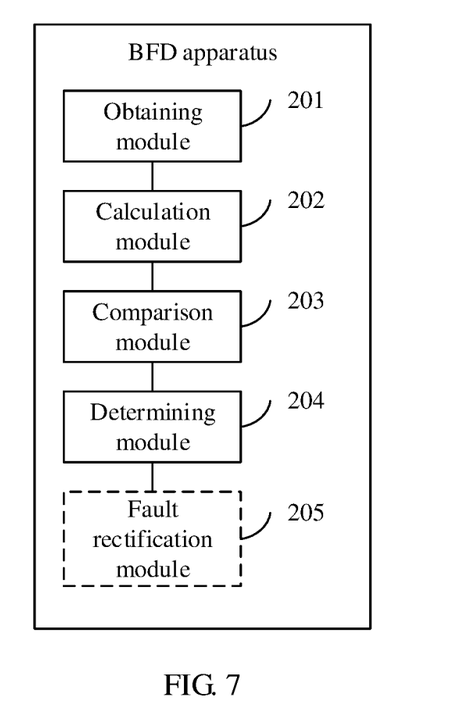
FIG. 7 is a schematic diagram of a BFD apparatus according to an embodiment of the present disclosure.

A first virtual machine and a second virtual machine generally refer to two virtual machines that are communicating with each other in a virtualized cloud environment. Generally, bidirectional communication is performed between the two virtual machines. The first virtual machine may receive a packet from the second virtual machine, and the second virtual machine may receive a packet from the first virtual machine. Therefore, a BFD mechanism in each virtual machine is similar. Referring to FIG. 7, FIG. 7 is a schematic diagram of a BFD apparatus according to an embodiment of the present disclosure. The apparatus in this embodiment is applied to a process in which a first virtual machine receives BFD packets. The BFD packets are from a second virtual machine. The apparatus may be located in the first virtual machine, or may be located outside the virtual machines and used as an upper-layer function apparatus monitoring a communication status of the first virtual machine and the second virtual machine. The apparatus includes an obtaining module 201, a calculation module 202, a comparison module 203, and a determining module 204.

The obtaining module 201 is configured to obtain prediction duration and a predetermined quantity of sample time intervals. The prediction duration is a time interval between a current moment and a moment at which the first virtual machine receives a BFD packet last time. The sample time interval is an arrival time interval between two adjacent BFD packets.

The obtaining module 201 is configured to obtain time intervals between adjacent packets, particularly time intervals between consecutive packets are $(t_2-t_1)$, $(t_3-t_2)$, ..., $(t_N-t_{N-1})$. $t_m$ indicates an arrival time of an $m^{th}$ packet, and m may indicate any positive integer. The so-called predetermined quantity is usually determined according to a quantity of packets that can be stored in a virtual machine or according to a sample requirement of mathematical statistics. For example, the obtaining module 201 obtains $(t_M-t_{M-1})$, $(t_{M+1}-t_M)$, ..., $(t_N-t_{N-1})$. M is less than N. N−M is the predetermined quantity and is usually greater than 20. An $N^{th}$ packet is the last packet received by the first virtual machine before the current moment.

The calculation module 202 is configured to obtain an eigenvalue according to the prediction duration and the predetermined quantity of sample time intervals that are obtained by the obtaining module 201. The eigenvalue is used to indicate a possibility of fault occurrence on an application that is running on the second virtual machine.

Figure 8:
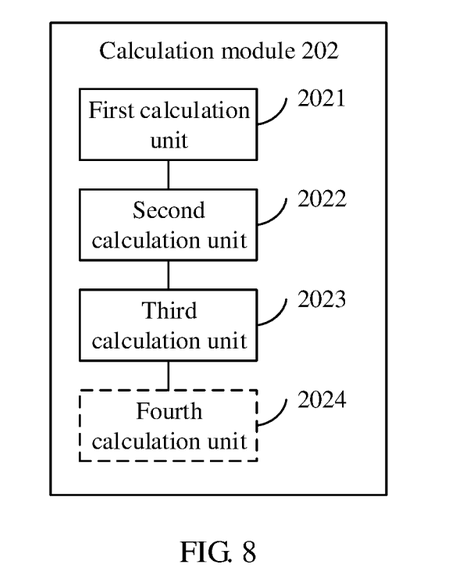
FIG. 8 is a schematic structural composition diagram of a calculation module in a BFD apparatus according to an embodiment of the present disclosure.

Referring to FIG. 8, FIG. 8 is a schematic structural composition diagram of a calculation module 202 in a BFD apparatus according to an embodiment of the present disclosure. Optionally, the calculation module 202 may include a first calculation unit 2021, a second calculation unit 2022, and a third calculation unit 2023.

The first calculation unit 2021 is configured to perform, according to a predetermined calculation rule, statistics collection on samples of the N−M sample time intervals, and calculate an average value μ and a variance σ of the N−M sample time intervals. Then the second calculation unit 2022 determines a probability density distribution function f(x) according to the average value μ and the variance σ. A universal formula is as follows:

$$\mu = \frac{1}{n}\sum_{j=1}^{n} \Delta t(j), \text{ and}$$

$$\sigma = \sqrt{\frac{1}{n}\sum_{j=1}^{n}[\Delta t(j) - \mu]^2},$$

where n indicates the predetermined quantity, that is, N−M. Δt(j) is a sample time interval, j is an integer, and j∈[1, n]. Further, f(x) can be calculated using the following equation:

$$f(x) = \frac{1}{\sigma\sqrt{2\pi}} e^{-\frac{(x-\mu)^2}{2\sigma^2}},$$

where x is the prediction duration.

Then, a probability, obtained by the third calculation unit 2023, of receiving no packet at the current moment is:

$$G(x; \mu, \sigma) = \frac{1}{\sigma\sqrt{2\pi}} \int_{x}^{+\infty} e^{-\frac{(x-\mu)^2}{2\sigma^2}} dx.$$

G(x; μ; σ) indicates a relationship between a magnitude of a sample time interval and a probability of successfully receiving, by the first virtual machine, a BFD packet. A loss of a detection packet reflects that an application is faulty. Therefore, G(x; μ; σ) also indicates a possibility of fault occurrence on an application. If no packet is received at the current moment $t_{now}$, a moment at which the first virtual machine receives a detection packet last time before $t_{now}$ is recorded as $t_{last}$. A probability of receiving a packet after $t_{now}$ is $G(t_{now}-t_{last}; \mu_{last}, \sigma_{last})$. $t_{now}-t_{last}$ is latest prediction duration.

Optionally, the probability is a decimal, and may be a relatively small decimal. Therefore, for ease of description, the calculation module 202 may further include a fourth calculation unit 2024. The fourth calculation unit 2024 takes the negative logarithm of a function value obtained by the third calculation unit 2023. $\psi = -\log[G(t_{now}-t_{last}; \mu_{last}, \sigma_{last})]$ is defined, and ψ is the eigenvalue.

Optionally, the calculation module 202 may alternatively include several calculation units. The several calculation units can obtain, according to a preset algorithm by completing a series of conventional mathematical operations, an eigenvalue that may be easily used subsequently.

The comparison module 203 is configured to compare the eigenvalue obtained by the calculation module 202 with a preset fault determining criterion of an application that is running on the second virtual machine. A preset fault determining criterion of each application in the second virtual machine is prestored in the comparison module 203.

The determining module 204 is configured to determine, according to a comparison result of the comparison module 203, whether the application is faulty.

In a specific implementation process, a fault management process performed by the comparison module 203 and the determining module 204 is similar to the method correspondingly performed in FIG. 5. There are various applications, and the applications have different functions and different reliability indicator requirements. Therefore, there are multiple different determining criteria. There are two common cases, separately shown in the following two examples.

Example 1

If a preset fault determining value of a voice service is a single threshold 0.2, the comparison module 203 compares the eigenvalue $\psi$ obtained by the calculation module 202 with 0.2. If a comparison result is that the eigenvalue is greater than or equal to 0.2, the determining module 204 determines that a first application is faulty. If the comparison result is that the eigenvalue is less than 0.2, the determining module 204 determines that the application, that is, the voice service, is not faulty or that the application makes no response.

Optionally, the apparatus may further include a fault rectification module 205. Correspondingly, if the determining module 204 determines that the voice service is faulty, the fault rectification module 205 in the apparatus takes a fault rectification action corresponding to the voice service such that the voice service can run normally. If the voice service is not faulty or is recovered after a fault is rectified, the determining module 204 determines that the voice service is not faulty or that the voice service makes no response, and further, the fault rectification module 205 skips performing fault rectification or makes no response.

Example 2

Preset fault determining values of an image transfer service are four value ranges. (0, 3] indicates that no fault occurs on the image transfer service, (3, 5] indicates that a first-level fault occurs on the image transfer service, (5, 10] indicates that a second-level fault occurs on the image transfer service, and (10, +∞) indicates that a third-level fault occurs on the image transfer service. The first-level fault, the second-level fault, and the third-level fault are respectively corresponding to a first-level fault rectification action, a second-level fault rectification action, and a third-level fault rectification action. The comparison module 203 compares the eigenvalue $\psi$ with the foregoing at least two threshold ranges, and determines a range within which the eigenvalue falls. The determining module 204 determines a fault level of the image transfer service according to the value range within which $\psi$ falls. As shown in FIG. 6, when the comparison module 203 determines that $\psi \in (0, 3]$, the determining module 204 determines that no fault occurs on the image transfer service, when the comparison module 203 determines that $\psi \in (3, 5]$, the determining module 204 determines that the first-level fault occurs on the image transfer service, when the comparison module 203 determines that $\psi \in (5, 10]$, the determining module 204 determines that the second-level fault occurs on the image transfer service, and when the comparison module 203 determines that $\psi \in (10, +\infty)$, the determining module 204 determines that the third-level fault occurs on the image transfer service. A larger threshold range value indicates a severer fault. For example, fault severity degrees of the first-level fault, the second-level fault, and the third-level fault increase sequentially.

Optionally, the apparatus may further include a fault rectification module 205. Correspondingly, if the determining module 204 determines that the image transfer service is faulty, the fault rectification module 205 in the apparatus takes a corresponding fault rectification action on the image transfer service according to a fault level determined by the determining module 204 such that the image transfer service can run normally. If the image transfer service is not faulty or is recovered after a fault is rectified, the determining module 204 determines that the image transfer service is not faulty or that the image transfer service makes no response, and further the fault rectification module 205 skips performing fault rectification or makes no response.

According to the BFD apparatus provided in this embodiment of the present disclosure, compared with a conventional BFD apparatus, a single value is no longer used for determining, and information about whether a fault occurs is no longer simply output. The BFD apparatus in the present disclosure includes the obtaining module 201, the calculation module 202, the comparison module 203, and the determining module 204, and may further include the fault rectification module 205. The obtaining module 201 and the calculation module 202 perform mathematical processing on time intervals between detection packets to obtain an eigenvalue used to determine whether an application is faulty. The comparison module 203 compares the eigenvalue with preset fault determining criteria of different applications. Then, the determining module 204 pertinently determines fault statuses of the applications. Therefore, in BFD, requirements of different types of applications can be satisfied, and conventional unified determining is no longer performed, thereby reducing fault misjudgment. Finally, the fault rectification module 205 can pertinently take a corresponding rectification action on an application that is faulty.

An embodiment of the present disclosure provides a BFD system. The system includes the first virtual machine, the second virtual machine, and the BFD apparatus that are described in the foregoing paragraphs. Optionally, the above-mentioned BFD apparatus may be located in the first virtual machine, directly receives BFD packets from the second virtual machine, and performs, on these detection packets, the above-mentioned method including step 101 to step 103 to determine whether an application that is running on the second virtual machine is faulty. Optionally, the BFD apparatus is located outside the virtual machines, used as an upper-layer management function apparatus of the first virtual machine and the second virtual machine, obtains information about BFD packets in a process in which the first virtual machine receives these packets from the second virtual machine, and performs, on these detection packets, the above-mentioned method including step 101 to step 103 to determine whether an application that is running on the second virtual machine is faulty.

Figure 9:
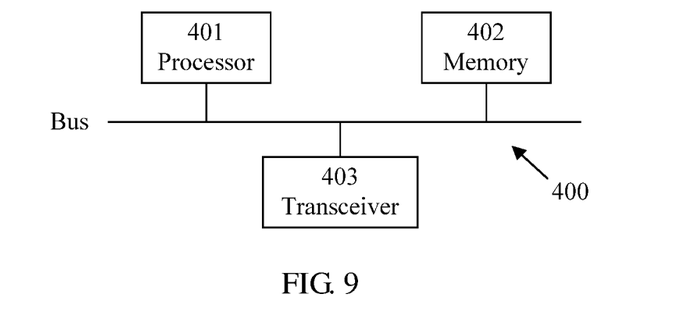
FIG. 9 is a schematic structural diagram of a BFD device according to an embodiment of the present disclosure.

Referring to FIG. 9, FIG. 9 is a schematic structural diagram of a BFD device 400 according to an embodiment of the present disclosure. The device 400 includes a processor 401, a memory 402, and a transceiver 403.

The processor 401 is configured to generate a corresponding operation control signal, transmit the operation control signal to a corresponding component of a computing processing device, and read and process data in software, especially read and process data and a program in the memory 402 such that all function modules in the processor 401 perform corresponding functions to control a corresponding component to perform an action according to an instruction requirement.

The memory 402 is configured to store the program and various data, and mainly store software units such as an operating system, an application, and a function instruction, or a subset thereof, or an extension set thereof. The memory 402 may further include a non-volatile random access memory (NVRAM) and provide the processor 401 with functions including managing hardware, software, and data resources in the computing processing device and supporting control on the software and the application.

The transceiver 403 is configured to collect, obtain, or transmit information, and may be used between modules to transfer information.

All the foregoing hardware units may be connected using a bus for communication.

In this way, when the transceiver 403 receives BFD packets from a second virtual machine, the processor 401 obtains prediction duration and a predetermined quantity of sample time intervals by invoking the program or an instruction stored in the memory 402. The processor 401 performs operation processing on the predetermined quantity of sample time intervals according to an algorithm prestored in the memory 402 to obtain an eigenvalue, compares the eigenvalue with a preset fault determining criterion of each application that is running on a detected node, and determines, according to a comparison result, whether there is an application that is faulty. Then, the processor 401 performs corresponding fault rectification on an application that is faulty.

A person of ordinary skill in the art may understand that all or some of the steps of the foregoing methods may be implemented by a program instructing relevant hardware. The program may be stored in a computer readable storage medium. With descriptions of the foregoing embodiments, a person skilled in the art may clearly understand that the present disclosure may be implemented by hardware, firmware or a combination thereof.

The foregoing embodiments are merely examples of embodiments of the technical solutions of the present disclosure, but are not intended to limit the protection scope of the present disclosure. Any modification, equivalent replacement, or improvement made without departing from the principle of the present disclosure shall fall within the protection scope of the present disclosure.

What is claimed is:

1. A bidirectional forwarding detection (BFD) detection method applied to a process in which a first virtual machine receives BFD packets from a second virtual machine, and wherein the method comprises:
    obtaining a prediction duration and a predetermined quantity of sample time intervals, wherein the prediction duration comprises a time interval between a current moment and a moment at which the first virtual machine receives a BFD packet last time, and wherein a sample time interval comprises an arrival time interval between two adjacent BFD packets;
    performing a statistical calculation on the sample time intervals;
    obtaining a result of the statistical calculation;
    obtaining an eigenvalue according to the prediction duration and the result of the statistical calculation, wherein the eigenvalue indicates a possibility of successfully receiving a next BFD packet from the second virtual machine after the prediction duration expires;
    comparing the eigenvalue with a preset fault determining criterion of an application that is running on the second virtual machine; and
    determining whether the application is faulty based on a comparison of the eigenvalue with the preset fault determining criterion.

2. The method according to claim 1, wherein obtaining the eigenvalue comprises:
    obtaining an average value and a variance of the sample time intervals according to the predetermined quantity of sample time intervals;
    obtaining a distribution function according to the average value and the variance of the sample time intervals;
    substituting the prediction duration into the distribution function to calculate a function value; and
    obtaining the eigenvalue according to the function value.

3. The method according to claim 2, wherein obtaining the eigenvalue according to the function value comprises taking a negative logarithm of the function value to obtain the eigenvalue.

4. The method according to claim 1, wherein the preset fault determining criterion of the application comprises a non-fault value range and a fault value range, and wherein comparing the eigenvalue with the preset fault determining criterion of the application, and determining whether the application is faulty comprises:
    determining whether the eigenvalue falls within the fault value range; and
    determining that the application is faulty in response to the comparison result indicating that the eigenvalue falls within the fault value range.

5. The method according to claim 1, wherein the preset fault determining criterion of the application comprises a non-fault value range and a fault value range, and wherein comparing the eigenvalue with the preset fault determining criterion of the application, and determining whether the application is faulty comprises:
    determining whether the eigenvalue falls within the non-fault value range; and
    determining that the application is not faulty in response to the comparison result indicating that the eigenvalue falls within the non-fault value range.

6. The method according to claim 4, wherein after determining that the application is faulty, the method further comprises performing fault rectification on the application.

7. The method according to claim 1, wherein the preset fault determining criterion of the application comprises a non-fault value range and at least two fault value ranges, wherein each fault value range corresponds to a different fault level, and wherein comparing the eigenvalue with the preset fault determining criterion of the application, and determining whether the application is faulty comprises:
    determining whether the eigenvalue falls within one of the at least two fault value ranges; and
    determining that a fault level of the application comprises a fault level corresponding to a fault value range in response to the comparison result indicating that the eigenvalue falls within the fault value range, wherein the fault value range comprises one of the at least two fault value ranges.

8. The method according to claim 1, wherein the preset fault determining criterion of the application comprises a non-fault value range and at least two fault value ranges, wherein each fault value range corresponds to a different fault level, and wherein comparing the eigenvalue with the preset fault determining criterion of the application, and determining whether the application is faulty comprises:
    determining whether the eigenvalue falls within the non-fault value range; and
    determining that the application is not faulty in response to the comparison result indicating that the eigenvalue falls within the non-fault value range.

9. The method according to claim 7, wherein each fault value range corresponds to a different fault rectification manner, and wherein after determining that the fault level of the application comprises the fault level corresponding to the fault value range, the method further comprises performing, on the application, fault rectification corresponding to the fault value range.

10. The method according to claim 1, wherein the predetermined quantity comprises M sample time intervals, wherein the M sample time intervals are obtained from M+1 consecutive BFD packets, and wherein M is an integer greater than 20.

11. A bidirectional forwarding detection (BFD) apparatus applied to a process in which a first virtual machine receives BFD packets from a second virtual machine, and wherein the BFD apparatus comprises:
a memory comprising instructions; and
a processor coupled to the memory, wherein the instructions cause the processor to be configured to:
obtain a prediction duration and a predetermined quantity of sample time intervals, wherein the prediction duration comprises a time interval between a current moment and a moment at which the first virtual machine receives a BFD packet last time, and wherein a sample time interval comprises an arrival time interval between two adjacent BFD packets;
perform a statistical calculation on the sample time intervals;
obtain a result of the statistical calculation;
obtain an eigenvalue according to the prediction duration and the result of the statistical calculation, wherein the eigenvalue indicates a possibility of successfully receiving a next BFD packet transmitted by the second virtual machine after the prediction duration expires;
compare the eigenvalue with a preset fault determining criterion of an application that is running on the second virtual machine; and
determine whether the application is faulty based on a comparison of the eigenvalue with the preset fault determining criterion.

12. The apparatus according to claim 11, wherein the instructions further cause the processor to be configured to:
obtain an average value and a variance of the sample time intervals according to the predetermined quantity of sample time intervals;
obtain a distribution function according to the average value and the variance of the sample time intervals;
substitute the prediction duration into the distribution function to calculate a function value; and
obtain the eigenvalue according to the function value.

13. The apparatus according to claim 12, wherein the instructions further cause the processor to be configured to take a negative logarithm of the function value to obtain the eigenvalue.

14. The apparatus according to claim 11, wherein the preset fault determining criterion of the application comprises a non-fault value range and a fault value range, and wherein the instructions further cause the processor to be configured to:
determine whether the eigenvalue falls within the fault value range; and
determine that the application is faulty in response to the comparison result indicating that the eigenvalue falls within the fault value range.

15. The apparatus according to claim 11, wherein the preset fault determining criterion of the application comprises a non-fault value range and a fault value range, and wherein the instructions further cause the processor to be configured to:
determine whether the eigenvalue falls within the non-fault value range; and
determine that the application is not faulty in response to the comparison result indicating that the eigenvalue falls within the non-fault value range.

16. The apparatus according to claim 14, wherein the instructions further cause the processor to be configured to perform fault rectification on the application after determining that the application is faulty.

17. The apparatus according to claim 11, wherein the preset fault determining criterion of the application comprises a non-fault value range and at least two fault value ranges, wherein each fault value range corresponds to a different fault level, and wherein the instructions further cause the processor to be configured to:
determine whether the eigenvalue falls within one of the at least two fault value ranges; and
determine that a fault level of the application comprises a fault level corresponding to a fault value range in response to the comparison result indicating that the eigenvalue falls within the fault value range, wherein the fault value range comprises one of the at least two fault value ranges.

18. The apparatus according to claim 11, wherein the preset fault determining criterion of the application comprises a non-fault value range and at least two fault value ranges, wherein each fault value range corresponds to a different fault level, and wherein the instructions further cause the processor to be configured to:
determine whether the eigenvalue falls within the non-fault value range; and
determine that the application is not faulty in response to the comparison result indicating that the eigenvalue falls within the non-fault value range.

19. The apparatus according to claim 17, wherein each fault value range corresponds to a different fault rectification manner, and wherein after determining that the fault level of the application comprises the fault level corresponding to the fault value range, the instructions further cause the processor to be configured to perform, on the application, fault rectification corresponding to the fault value range.

20. The apparatus according to claim 11, wherein the predetermined quantity comprises M sample time intervals, wherein the M sample time intervals are obtained from M+1 consecutive BFD packets, and wherein M is an integer greater than 20.

* * * * *